United States Patent
Lu

(10) Patent No.: US 6,873,646 B2
(45) Date of Patent: Mar. 29, 2005

(54) PERTURBATION APPARATUS AND METHOD FOR USER DETECTION IN A MULTIPLE-ACCESS COMMUNICATION SYSTEM

(75) Inventor: Chun Chian Lu, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 792 days.

(21) Appl. No.: 09/902,695

(22) Filed: Jul. 12, 2001

(65) Prior Publication Data

US 2003/0012263 A1 Jan. 16, 2003

(51) Int. Cl.[7] .............................................. H04L 27/30
(52) U.S. Cl. ...................... 375/144; 375/148; 375/349; 370/335; 370/342; 370/479; 455/303
(58) Field of Search .............................. 375/142, 144, 375/148, 150, 343, 346, 349; 370/320, 335, 342, 441, 479; 455/296, 303

(56) References Cited

U.S. PATENT DOCUMENTS

| | | | |
|---|---|---|---|
| 5,467,368 A | 11/1995 | Takeuchi et al. | ............. 375/206 |
| 5,790,606 A | 8/1998 | Dent | ........................ 375/348 |
| 5,917,829 A | 6/1999 | Hertz et al. | .................. 370/479 |
| 6,240,099 B1 * | 5/2001 | Lim et al. | .................... 370/441 |
| 6,301,293 B1 * | 10/2001 | Huang et al. | ................ 375/130 |

OTHER PUBLICATIONS

A. J. Viterbi, "Very Low Rate Convolutional Codes for Maximum Theoretical Performance of Spread–Spectrum Multiple–Access Channels," IEEE Journal on Selected Areas in Communications, vol. 8, No. 4, pp. 641–649, May 1990.

S. Moshavi, "Multi–User Detection for DS–CDMA Communications," IEEE Communications Magazine, vol. 34, No. 10, pp. 124–136, Oct. 1996.

(Continued)

Primary Examiner—Dac V. Ha
(74) Attorney, Agent, or Firm—Shaw Pittman LLP

(57) ABSTRACT

A single-user detection method operates to reduce the effects of interference in multi-user detection systems. Based upon a number of received user codes, a receiver defines a frame of symbols containing at least one window. A symbol amplitude of a single-user in a multi-user system is approximated over the window of the frame and a perturbative correction value is calculated based upon a correlation or decorrelation matrix, which is determined by the delay spread of the signals. An estimation of the symbol amplitude of the single-user signal is calculated over one or a number of windows of the frame. The single-user signal is detected when the symbol amplitudes of the entire signal within the frame has been calculated.

20 Claims, 12 Drawing Sheets

OTHER PUBLICATIONS

C. C. Lu, "Perturbation methods for canceling multi-user interference," The Sixth IEEE Symposium on Computers and Communications, Hammamet, Tunisia, pp. 204–209, Jul., 2001.

C. C. Lu, "Perturbation Methods for canceling interference in CDMA systems," The Eighth IEEE International Conference on Electronics, Circuits and Systems, Malta, pp. 1143–1146, Sep. 2001.

C. C. Lu, "Perturbation principle of multi-user detection," The $3^{rd}$ IEEE International Conference on Mobile and Wireless Communications Networks, Recife, Brazil, Aug. 2001.

S. Verdu, "Minimum probability of error for asynchronous Gaussian multiple-access channels," IEEE Trans. Information Theory, vol. IT–32, No. 1, pp. 85–96, Jan. 1986.

R. Lupas and S. Verdu, "Linear multiuser detectors for synchronous code-division multiple-access channels", IEEE Trans. Information Theory, vol. 35, No. 1, pp123–136, Jan. 1989.

M. Honig, U. Madhow and S. Verdu, "Blind adaptive multiuser detection", IEEE Trans. Information Theory, vol. 41, No. 4, pp. 944–960, Jul. 1995.

S. Moshavi, "Multi-user detection for DS–CDMA communications", IEEE Communications Magazine, pp. 124–136, Oct. 1996.

C. C. Lu, "Frequency acquisition in a synchronous CDMA cordless phone using fast Walsh transform," IEEE PIMRC '95, Toronto, Canada, pp. 990–994, Sep. 1995.

C. C. Lu, "Computer simulation of a synchronized CDMA cellular phone system," IS–COM '93, 1993 International Symposium on Communications, vol. 1 p. 12–67, (Published by National Chiao Tung Univ., Hsinchu, Taiwan, Dec. 1993).

D. Divsalar, M. K. Simon and D. Raphaeli, "Improved parallel interference cancellation for CDMA," IEEE trans. Commun., vol. 46, No. 2, pp. 258–268, Feb. 1998.

* cited by examiner

PERTURBATION APPARATUS AND METHOD FOR USER DETECTION IN A MULTIPLE-ACCESS COMMUNICATION SYSTEM

BACKGROUND OF THE INVENTION

1. Field of the Invention

The present invention relates to a multi-user detection scheme in a direct sequence code-division multiple-access (DS-CDMA) system and, more particularly, to a method and apparatus for reducing the computations of a DS-CDMA receiver.

2. Description of Related Art

With the advent of cellular telephones and portable computers, wireless communication has become a preferred and increasingly prevalent method of communication. Multi-user detection used in wireless communication is directed toward the demodulation of digitally modulated signals in the presence of multi-access interference (MAI). Multi-user detection is most often applied in Code-Division Multiple-Access (CDMA) receiver designs. CDMA involves a method of multiplexing a group of users where each user is identified by a distinct code. Multiplexing allows any number of users the ability to transmit signals simultaneously, and allocates the entire available frequency spectrum to each user.

DS-CDMA is a popular technique of CDMA in which the transmitter multiplies each user's signal by a distinct code waveform. The receiver, due to an overlap of signals in time and frequency, detects a signal composed of the sum of all users' signals. The MAI component of the received signal is the result of random time offsets between the respective users' signals and makes the optimal design of orthogonal waveforms very difficult. In detecting a signal, a conventional DS-CDMA system uses an auto-correlation technique in which the entire received signal is correlated to a particular user's code waveform. This technique is limited because of a single-user detection strategy, which detects each user separately, not taking into account information within the signals of other users.

Multi-user detection strategies have been developed that use information of many users to better detect the coded signal of each individual user. These strategies are further described by Shimon Moshavi in "Multi-User Detection for DS-CDMA Communications", IEEE Communications Magazine, October 1996, hereby incorporated by reference. Some prior art multi-user detection methods use techniques that model the received signal over the entire message. While this method captures a comprehensive interaction of users, the computations involve an ensemble of many bits, which introduces an abundance of excess processing. Other prior art methods involve partial correlation, which accounts for the partial overlap of bits within a channel. However, such methods require much iteration to compensate for signal loss due to interference.

In light of the limitations of the aforementioned prior art, there is a need for a DS-CDMA system that can effectively reduce the effects of signal interference when detecting the signal of a particular user within a multi-user system.

SUMMARY OF THE INVENTION

The present invention provides a method and apparatus to significantly reduce the amount of processing necessary to attain a reduction in the effects of interference when detecting the signal of a single-user within a multi-user system.

In accordance with the purpose of the invention, as embodied and broadly described, one aspect of the invention provides a method of single-user projection detection in a multiple access communication system. The method comprises the steps of defining a frame including a plurality of user signals, each user signal having at least three symbols within a window of the frame; approximating a plurality of symbol amplitudes for each user among a plurality of users in the window; computing a set of correlation matrices based upon a plurality of channel parameters in the frame; calculating a current estimate of the approximated symbol amplitudes corresponding to at least one symbol of every user in the window using the set of correlation matrices in a perturbation correction technique; and shifting the window of the frame and returning to the step of calculating a current estimate of the symbol amplitude, when an entire user signal has not been processed.

Another aspect of the present invention provides a method of multi-user decorrelation detection in a multiple-access communication system. The method comprises the steps of defining a frame including a plurality of user signals, each user signal having at least three symbols within the frame; approximating a plurality of symbol amplitudes for each user among a plurality of users in the frame; computing a decorrelation matrix and a set of correlation matrices based upon a plurality of channel parameters in the frame; calculating a current estimate of the approximated symbol amplitudes corresponding to at least one symbol of every user in the window using the decorrelation matrix and a set of correlation matrices in a perturbation correction calculation; and shifting the window of the frame and returning to the step of calculating a current estimate of the symbol amplitude, when an entire user signal has not been processed.

Still another aspect of the present invention provides a method of detecting at least one of a plurality of users in a multiple-access communication system. The method comprises the steps of defining a frame including a plurality of user signals, each signal being allocated at least three symbols within a window of the frame; comparing a delay spread of the frame to a predetermined threshold; approximating a symbol amplitude for each user of the plurality of users in the window; computing a set of correlation matrices and a decorrelation matrix based upon a plurality of channel parameters in the frame, the set of correlation matrices and decorrelation matrix being determined by a result of the delay spread comparison; calculating a current estimate of the approximated symbol amplitude corresponding to at least one symbol of each user in the window using the determined matrices in a perturbation correction calculation; and shifting the window of the frame and returning to the step of calculating a current estimate of the symbol amplitude, when an entire user signal has not been processed.

Another aspect of the present invention provides a method of detection in a multiple access communication system. The method comprises the steps of defining a frame including a plurality of user signals, each user signal having at least three symbols within a window of the frame; approximating a symbol amplitude for each user of the plurality of users in the frame; obtaining a perturbation correction value using immediate feedback, wherein a new estimated amplitude is used as soon as it is available; calculating a current estimate of the approximated symbol amplitude corresponding to at least one symbol of every user in the frame based upon a perturbation correction calculation; and shifting the window and returning to the step of calculating a current estimate of the symbol amplitude, when an entire user signal has not been processed.

In addition, another aspect of the invention provides an apparatus for detecting at least one of a plurality of users in a multiple-access communication system. The apparatus comprises means for defining a frame, wherein the frame includes a plurality of user signals each user signal having at least three symbols within a window of the frame; means for approximating a plurality of symbol amplitudes for each user among a plurality of users in the window; means for computing a set of correlation matrices based upon a plurality of channel parameters in the frame; means for calculating a current estimate of the approximated symbol amplitudes corresponding to at least one symbol for every user in the window using the set of correlation matrices and the decorrelation matrix in a perturbation correction technique; means for shifting the window of the frame and recalculating the current estimate of the symbol amplitude when an entire user signal has not been processed; and means for detecting the signal of at least one of a plurality of users when the symbol amplitude for the at least one user has been estimated.

Additional features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

DETAILED DESCRIPTION

Figure 1A:
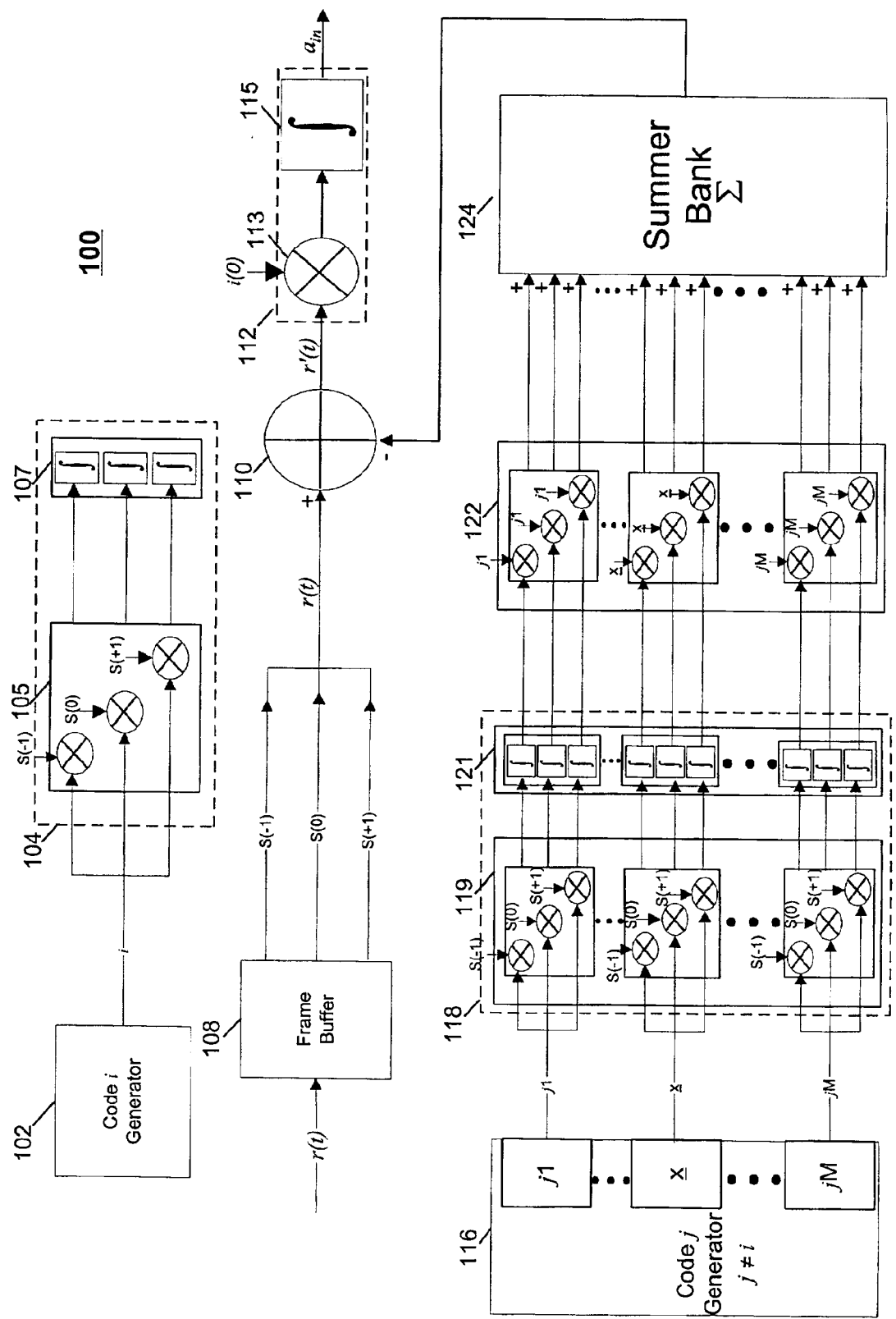
FIG. 1A illustrates the structure of a perturbation CDMA receiver consistent with the present invention.

FIG. 1A illustrates general features of a perturbation CDMA receiver 100 consistent with the present invention. At a transmitter (not shown) a signal of a user is modulated using a shift-keying technique, multiplied by a distinct user code, and subsequently transmitted. A received signal r(t) includes information of all users transmitting information across multiple channels. Perturbation CDMA receiver 100 receives signal r(t) as a series of binary pulses called symbols. To detect a signal of one or more users, perturbation CDMA receiver 100 includes a user code i generator 102, user code j generator 116, correlator banks 104, 112, 118, received signal frame buffer 108, summer banks 110 and 124.

Code i generator 102 is an oscillator that locally generates a distinct user code to detect the information of a single user i in received signal r(t). Due to code delay derived from the delay lock tracking of received signal r(t), the user code generated by user generator 102 begins at a time $\tau_i$.

Code j generator 116 is an oscillator that locally generates the distinct user codes corresponding to users other than user i having information contained in received signal r(t). User signals having distinct codes and delays are identified as interference signals.

Frame buffer 108 buffers the received signal r(t) and separates the signal into contiguous windows, where each user signal within a particular window contains three symbols with values –1, 0, and 1.

Correlator banks 104, 112, and 118 contain multiplier banks 105, 113, and 119, respectively for matching the information of two separate signals, and integrator banks 107, 115, and 121, respectively, to suppress portions of the matched information. The signals matched by each abovementioned correlator will be described in further detail below.

Summer banks 110 and 124 add the results of at least two signals to calculate the effects of interference. The operation of summer banks 110 and 124 will be described in further detail below.

In FIG. 1A, multiplier bank 105 of correlator bank 104 matches a sample of the code generated by user code i generator 102 and a corresponding coherent sample from the symbols S(–1), S(0), and S(+1), respectively, of received signal r(t), through a multiply operation. Next, integrator bank 107 of correlator bank 104, integrates the product over the duration of each respective symbol, and dumps the integration result. The dumped integration result represents single-user detection values or zero-order amplitudes of the user signal and is used when calculating the amplitude of users other than user i having information contained in received signal r(t).

Multiplier bank 119 of correlator bank 118 matches a sample of each generated user code j1 through jM generated by code j generator 116 corresponding to a user signal included in signal r(t), to a sample of the symbols S(–1), S(0), and S(+1), respectively, corresponding to a window of received signal r(t), through a multiply operation. Integrator bank 121 of correlator bank 118 integrates the product producing three zero-order amplitudes for each generated user code j1 through jM at the given code delay. Next, multiplier bank 122 multiplies the zero order amplitudes by the corresponding generated user code j1 through jM. Next, summer bank 124 adds the results of multiplier bank 122 producing a signal having a time sequence in parallel with the received signal r(t). Summer bank 110 produces signal r'(t) by computing a difference between the resultant signal of summer bank 124 and the portion of signal r(t) contained in the window under analysis. Multiplier 113 of correlator bank 112 matches the middle symbol of signal r'(t) with the user code i generated by user code i generator 102 and integrator 115 suppresses any unwanted portions of the signal to produce the first order corrected amplitude $a_{in}$.

Figure 1B:
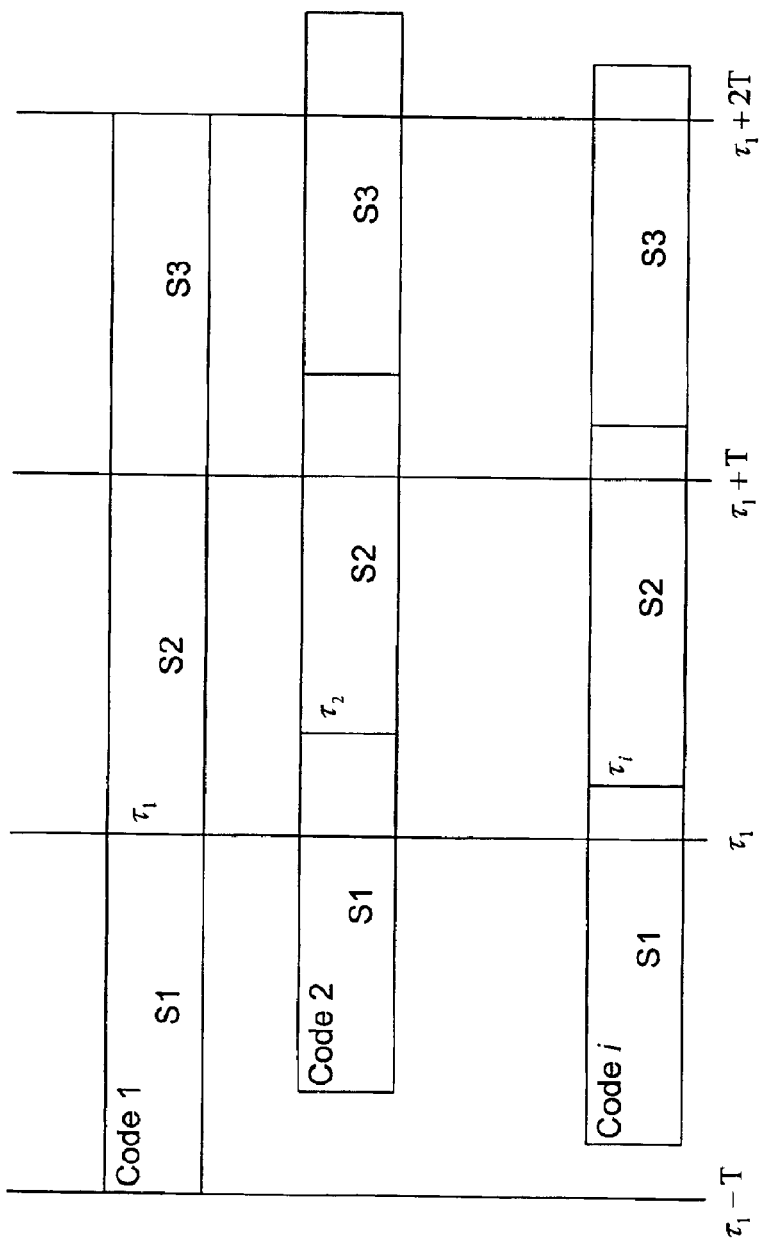
FIG. 1B illustrates the defined frame of user signals consistent with the present invention.

FIG. 1B illustrates an example of a 3-symbol window used in implementing the present invention. In practical CDMA applications, the channel is asynchronous, which means the non-coherent signals are randomly delayed and offset from one another. Because each user code has a different delay, the symbol boundary of a particular user code relative to the symbols of all the user codes in a window are non-uniform, i.e., asynchronous. Therefore, in embodiments consistent with the present invention, at time t within any 3-symbol window, the received non-coherent spread spectrum baseband signal corresponding to M users can be written as follows:

$$r(t) = \sum_{i=1}^{M} \sum_{n=-1}^{1} a_{in} \psi_i(t - \tau_i - nT) \quad (1)$$

where $\psi_i$=spreading code of user i,
$\tau_i$=time delay of $\psi_i$ at t=0,
T=symbol period; $\tau_i$<T,
$a_{in}$=amplitude of nth symbol of ith user.

$\psi_i$ is defined for t between $\tau_i$+nT and $\tau_i$+(n+1)T, and $\psi_i$ is zero for t outside the current window of the frame. As shown in FIG. 1B, any three users are represented by three codes: Code 1, Code 2, and Code i. Each user's code is segmented into three symbols (S1, S2, S3), and each user has one symbol starting in each of three time intervals [−T, 0], [0, T], and [T, 2T]. For example, user i has the first symbol S1 starting at time $\tau_i$−T and ending at time $\tau_i$, the second symbol S2 starts at time $\tau_i$ and ends at time $\tau_i$+T, and the third symbol S3 starts at time $\tau_i$+T and ends at time $\tau_i$+2T. Any symbol that does not fall in current intervals will have no effect on the symbols in the current intervals.

Figure 2:
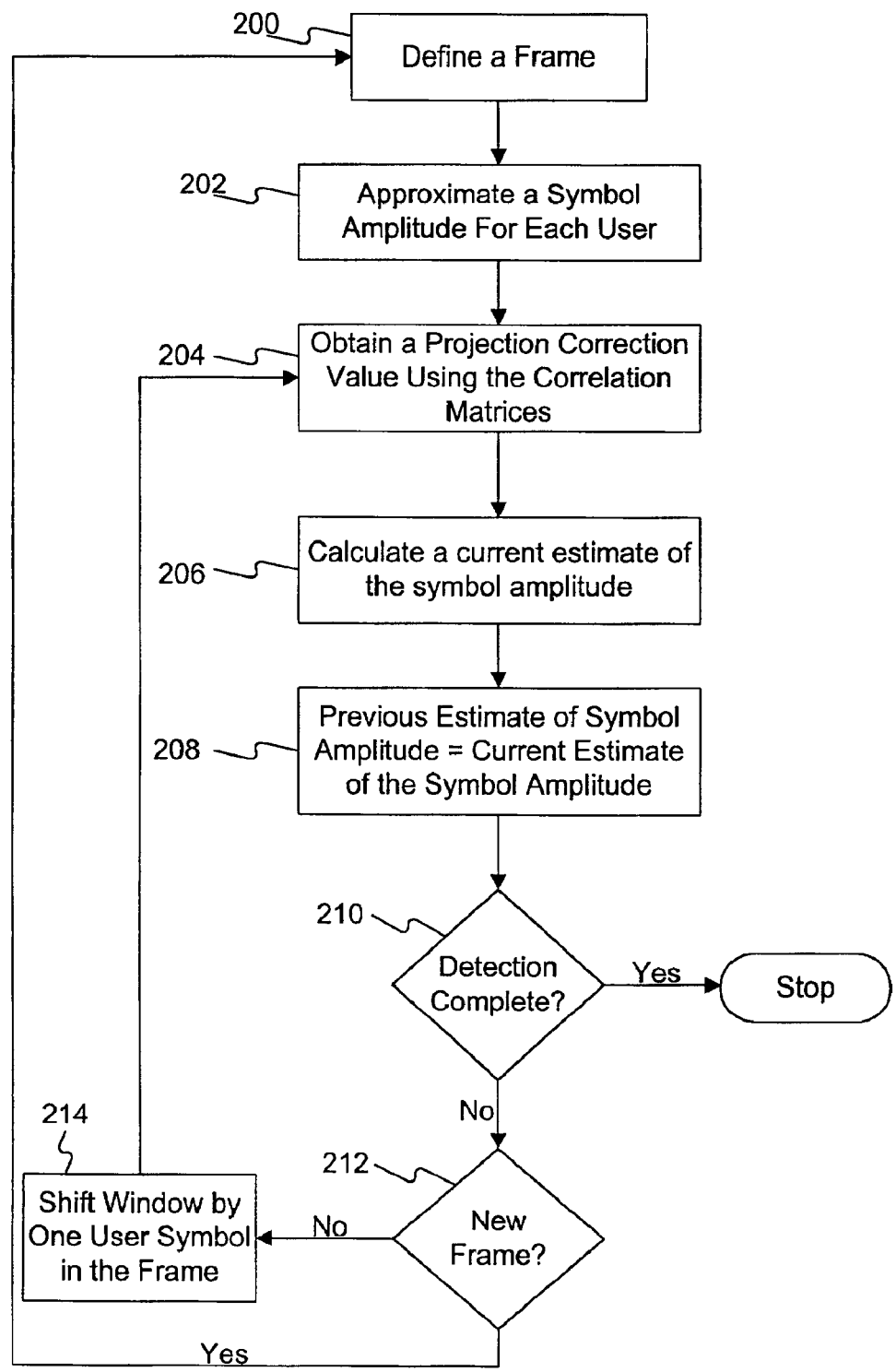
FIG. 2 shows a flow diagram illustrating single-user projection detection consistent with the present invention.

A detailed flowchart illustrating one aspect of perturbation correction calculations according to the present invention is shown in FIG. 2. The flow chart illustrates the processing that takes place during single-user projection by the CDMA receiver 100. With reference to FIG. 2, in step 200, frame buffer 108 receives the transmitted signal and defines the window as shown in FIG. 1B. Over the course of the transmission, the user signals within a current window of the frame are communicated over a significantly invariant channel. Specifically, the channel parameters for each user including code, code delay, carrier frequency, and phase are nearly constant over the entire signal. Code delay is the beginning time of a code measured by a common reference clock. Carrier frequency is the frequency of the sinusoidal function of the oscillator (not shown) used in the transmitter to up convert the baseband signal to a desired band (range of frequency) for transmission. CDMA receiver 100 regains the original baseband signal by down converting the received signal with a signal generated by user code i generator 102 having the same carrier frequency and phase of the original oscillator. The variable r in Eq. (1) defines the baseband signal. The correlation value is an implicit function of the measured r(t) and is usually a complex quantity due to the variable phase at the CDMA receiver 100. Here, although computations using r(t) mainly involve the real part of the value, the imaginary part may also be treated in the same manner. Therefore, embodiments consistent with the present invention are constructed based on the assumption that the channel parameters are constant over an entire frame. Each channel parameter is further defined by a set of margins—a range of values having upper and lower limits—that also determine the duration of the frame. Because the values in the range are usually determined by the resolution of the measurement apparatus, the range values are regarded as nearly constant. The tracking of these parameters has been treated extensively in CDMA systems, is well known, and is not discussed in further detail.

In step 202, the amplitude of one of the user signals within the defined frame is approximated using an auto-correlation technique. This technique is effective to maximize the signal and minimize the interference or cross-correlation. The zero-order approximation is performed neglecting interference, which means that delay tracking is assumed perfect and user codes j1 through jM are nearly orthogonal.

The single user detector computes symbol amplitude $a_{in}$ with bit (±1) data from equation (1) as follows:

$$a_{in} \approx c_{in} = \frac{(\psi_i(\tau_i + nT), r)}{(\psi_i(\tau_i + nT), \psi_i(\tau_i + nT))}; r_i = c_{i0} \quad (2)$$

Eq. (2) uses the scalar product notation (x,y) for correlation defined as $(x,y) = \int_0^r x(t)y(t)dt$. These terms in equation (2) are defined above in connection with equation (1), Because this approximation is calculated assuming orthogonal codes, which are not normally encountered in actual practice, a correction value is obtained according to the perturbation theory. Using perturbation theory and assigning $c'_{in}$ as the correction value and $c_{in}$ as the estimated value given by Eq. (2), $a_{in}$ is defined as follows:

$$a_{in} = c_{in} + c'_{in} \quad (3)$$

If $a_{in}$ defined in equation (3) is substituted into equation (1) the following equation (4) results:

$$\sum_{i=1}^{M} \sum_{n=-1}^{1} c'_{in} \psi_i(t - t_i - nT) = r(t) - \sum_{i=1}^{M} \sum_{n=-1}^{1} c_{in} \psi_i(t - t_i - nT) \quad (4)$$

In equation (4), r(t) represents the measured value of the received signal. The variable $c_{in}$ represents the estimated value obtained from Eq. (2), and $\psi_i$ represents the given user codes. All values on the right hand side of equation (4) are known, whereas, $c'_{in}$ values located on the left hand side of equation (4) are the only unknown values.

The perturbation correction value $c'_{in}$ is calculated (step 204) based upon the cross-correlation between the symbol of one user and the adjacent symbols of other users within a current window of the frame. This correction value is obtained by calculating $c'_{in}$ in equation (4) using the present values for user i, and current symbol n=0. When the value of the right-hand side of equation (4) has been calculated for the symbol of a user i, a value of the perturbation correction in matrix-vector notation is approximately given as:

$$c'_{j0} = \frac{r_j}{N_{j0}} - \sum_{i=1}^{M} \sum_{n=-1}^{1} c_{in} H_{ji}(n); j = 1 \text{ to } M \quad (5)$$

where the correlation matrix $H_{ji}(n)$ represents the cross-correlation between the adjacent symbols n=−1, 0, 1 within the current window of the frame and between user code i and user code j. The correlation matrix is given by $$H_{ji}(n) = \frac{1}{N_{j0}} (\psi_j(\tau_j), \psi_i(\tau_i + nT)) \quad (6)$$

where $N_{j0}$ provides a normalization value defined by $N_{j0} = (\Psi_i(\tau_i), \Psi_j(\tau_j))$. As indicated in the formula, the correlation matrix is a function of codes i and j and their respective delays $\tau_i$ and $\tau_j$ and it is independent of other channel parameters.

In FIG. 1B for example, the middle symbol of user 2 overlaps with other users with respect to at most two symbols in the frame. When the two adjacent user symbols are known, the right-hand side of equation (4) allows an explicit calculation of cross-correlation to the middle symbol of user 2. The right-hand side of equation (4) includes r(t), the total received signal of all users and $c_{in}$, the estimate on the first approximation of the user's symbol amplitude.

Once the correction value has been determined by the above projection method, processing continues at step 206 where an estimate of the symbol amplitude is calculated. This calculation is performed by substituting the correction value obtained at step 204 using equation (5) for the term $c'_{in}$ in equation (3). At step 208, this estimate of symbol amplitude $a_{in}$ replaces the first approximation of the symbol amplitude obtained in step 202.

At step 210, it is determined if the entire signal of the current window has been processed, and every user's amplitude has been corrected. When the entire signal has been processed, i.e., the amplitude of the entire signal has been estimated, the final estimated amplitude value $a_{in}$ is obtained from equation (2), the value of $a_{in}$ allows the approximate value of r(t) to be obtained. In contrast, if the entire signal has not been processed, processing continues at step 212 where it is determined whether a new frame has been defined (or obtained, or present, or received). When a new frame is defined, processing returns to step 202 where a first approximation of the signal amplitude is performed and steps 204 through 210 are repeated. However, when a new frame is not defined (step 212), the next iteration of amplitude estimation is performed. This next iteration updates the estimated amplitude value based upon a new symbol amplitude estimate of the current user in the current window of the frame. Performing the calculation of the next iteration begins at step 214 by shifting the current window by one user symbol. This window shift is defined in equation (5) by the term n that corresponds to samples of user code i. Processing continues by returning to step 204, where the correction value corresponding to the new user symbol within the current window of the frame is calculated and steps 206 through 210 are repeated.

Figure 3:
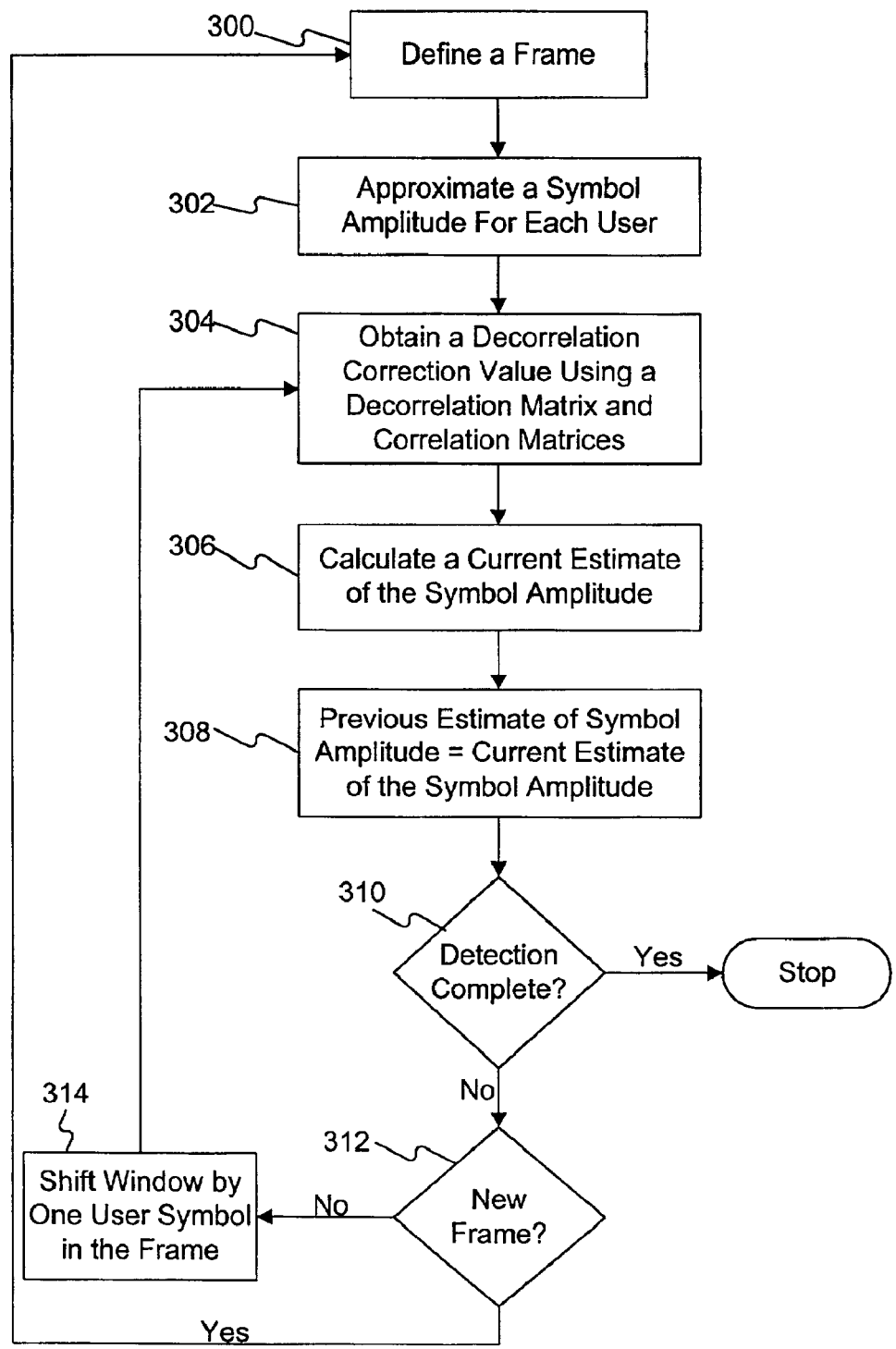
FIG. 3 shows a flow diagram illustrating multi-user decorrelation detection consistent with the present invention.

A second aspect of the present invention is illustrated by the flow chart in FIG. 3. The flow chart of FIG. 3 illustrates the processing of the CDMA receiver 100 during multi-user detection. The processing in steps 300, 302, and 306 through 314 are consistent with the processing as described above in steps 200, 202, and 206 through 214 of FIG. 2, respectively. At step 304, a decorrelation matrix is used to obtain the perturbation correction value. Perturbative decorrelation is performed by including the correlation of terms $\Psi_j(\tau_j)$ with the middle term (n=0) on the left-hand side of equation (4) to yield the following equation:

$$\sum_{i=1}^{M} c'_{i0} H_{ji}(0) = r_j - \sum_{i=1}^{M} \sum_{n=-1}^{1} c_{in} H_{ji}(n) \tag{7}$$

where $c'_{j0}$ is obtained by inverting the matrix $H_{ji}(0)$. The inversion matrix $(H_{ji}(0))^{-1}$ is representative of the decorrelation matrix and $H_{ji}(n)$ is representative of the correlation matrices. Use of the decorrelation matrix is most effective when the signals of the users are nearly synchronous. As noted above, there is no overlap of user signals within a synchronous system, i.e., the signals of other users contribute no useful information to each other. Therefore, for simplicity and limitation of M equations for M unknowns, the terms n=−1 and n=1 in the sum of the left-hand side of equation (4) are neglected. Moreover, when n=0 the correlation matrix $H_{ji}(0)$ is a subset of correlation matrix $H_{ji}(n)$.

Figure 4:
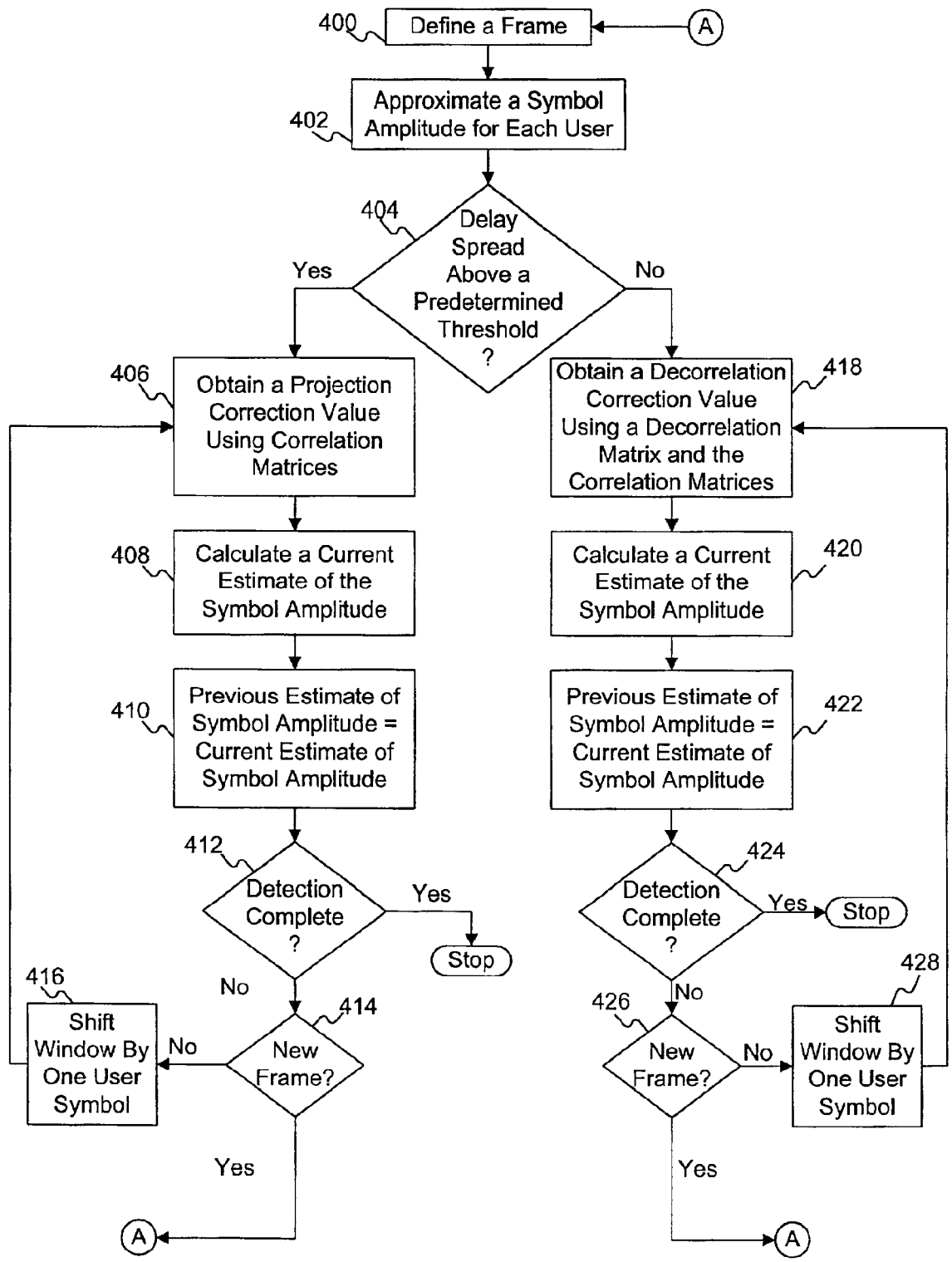
FIG. 4 shows a flow diagram illustrating a combined detection of at least one user consistent with the present invention.

The flow chart of FIG. 4, illustrates another process consistent with the present invention for performing high order perturbation calculations. The initial steps (400, 402) of defining a frame and approximating a symbol amplitude for a particular user are performed as explained above regarding the flowcharts in FIGS. 2 and 3. Next, at step 404, a delay spread of the symbols within the current window of the frame is evaluated to determine the type of matrix to be used during perturbation correction. If the delay spread is small, e.g., less than two chips, there is very little overlap between dropped and included terms, therefore multi-user decorrelation detection is performed according to steps 418–428, which correspond to previously described steps 304–314, respectively, using a correlation matrix. Otherwise, single-user projection detection according to steps 406–416, which correspond to previously described steps 204–214, respectively, is performed using a decorrelation matrix. The multi-user decorrelation and projection detection schemes operate as previously described for the process shown in FIGS. 2 and 3. However, when a new frame is defined, operation in each processing scheme returns to step 402 where an approximation of the symbol for the current user is acquired. Step 404 is again performed when a new frame is introduced.

Figure 5:
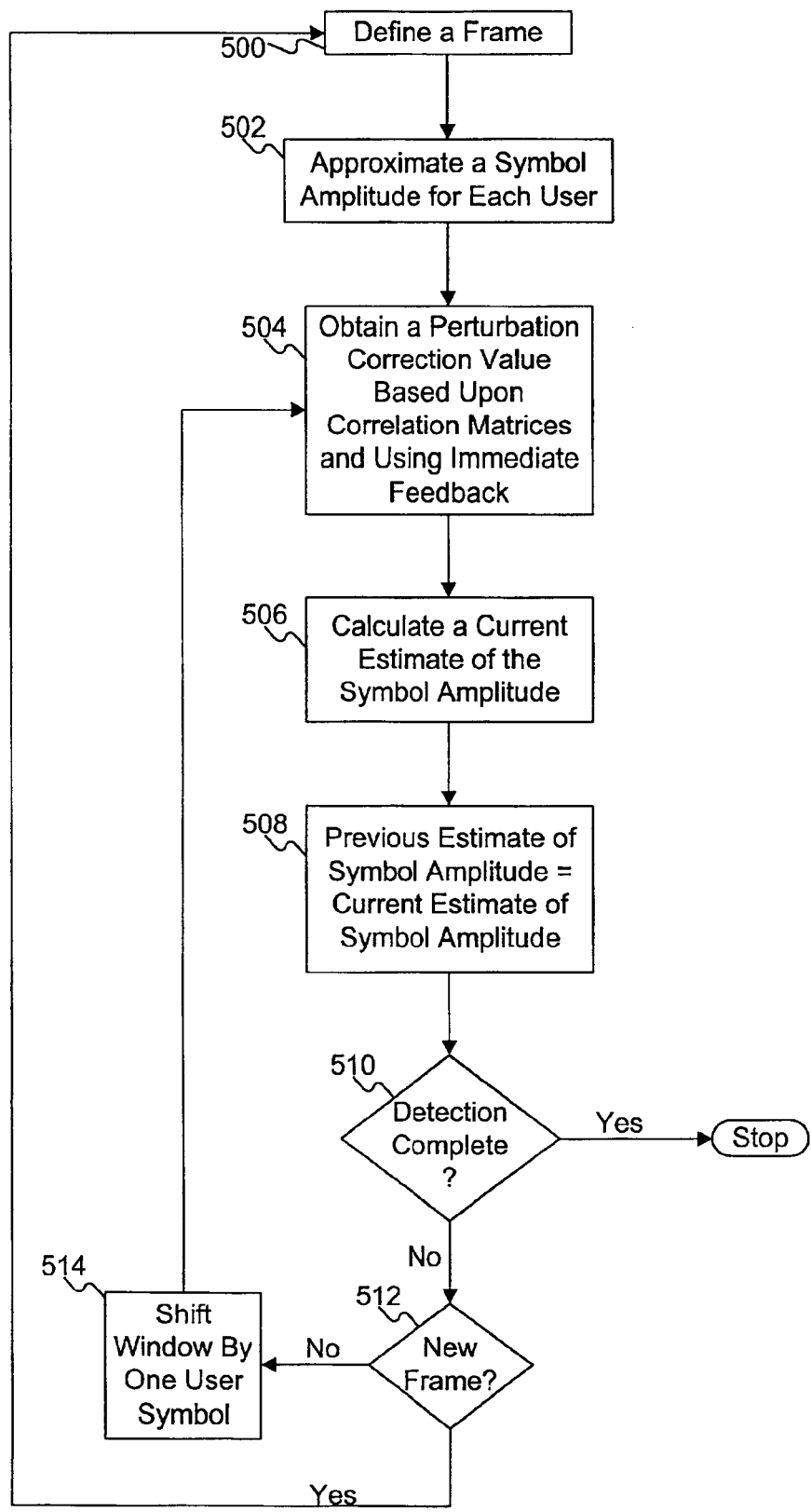
FIG. 5 shows a flow diagram illustrating single-user projection detection using immediate feedback consistent with the present invention.

The flow chart shown in FIG. 5 illustrates a further process consistent with the invention. The process in FIG. 5 relates to the perturbation method of FIG. 2, in the case in which the value of the previous approximation is used to calculate the next symbol. Steps 500, 502, and 506–514 are the same as steps 200, 202, and 206–214, respectively, of FIG. 2 and 300, 302, and 306–314 respectively of FIG. 3. In FIG. 5 at step 504, a perturbation correction value is obtained using an immediate feedback technique. This feedback technique is defined by equation (8) where the summation on the right-hand side (RHS) of equations (5) and (6) is changed to the following expression:

$$\sum( ) = \sum_{i=1}^{M} \sum_{n=0}^{1} c_{in} H_{ji}(n) + \sum_{i=1}^{M} a_{i(-1)} H_{ji}(-1) \tag{8}$$

Using immediate feedback for the calculation of the next symbol significantly improves the perturbation correction on the basis that there is no delay about the correction. This is in contrast to the prior art where many symbols are processed before feedback can be performed.

For the processing schemes described above and illustrated in FIGS. 2–5, obtaining the correlation or decorrelation matrix for a whole frame requires substantial computation. The computations involve all rows and columns of all users for each matrix. As noted above, when the signal codes of users are orthogonal and are identical for each symbol, the number of computations is relatively small. However, if each symbol of the orthogonal code is multiplied by a scrambling code, which is longer than the symbol and overlaps adjacent frames, then a matrix of every symbol must be computed. A scrambling code is a random sequence multiplied chip by chick on the spreading code. This is done to further randomize the spreading codes so that they have less cross correlation when they are not synchronous. In the multi-user detection receiver, scrambling becomes unnecessary because the interference will eventually be cancelled. This procedure invariably produces a very large number of computations. On the other hand, when the scrambling code is longer than the symbol but much shorter than the frame, the calculation of the correlation matrices is still efficient because the same correlation matrix can be reused.

In accordance with the present invention, in order to address the computational complexity resulting from use of a longer scrambling code, instead of calculating the correlation matrix for every symbol, it is more efficient to solve equation (4) directly because no correlation matrix is needed. The summation on the right-hand side of the equation is performed sample by sample, as shown in FIG. 1A, and both sides are correlated with $\psi_j(\tau_i)$ to obtain $c'_{j0}$.

Figure 6:
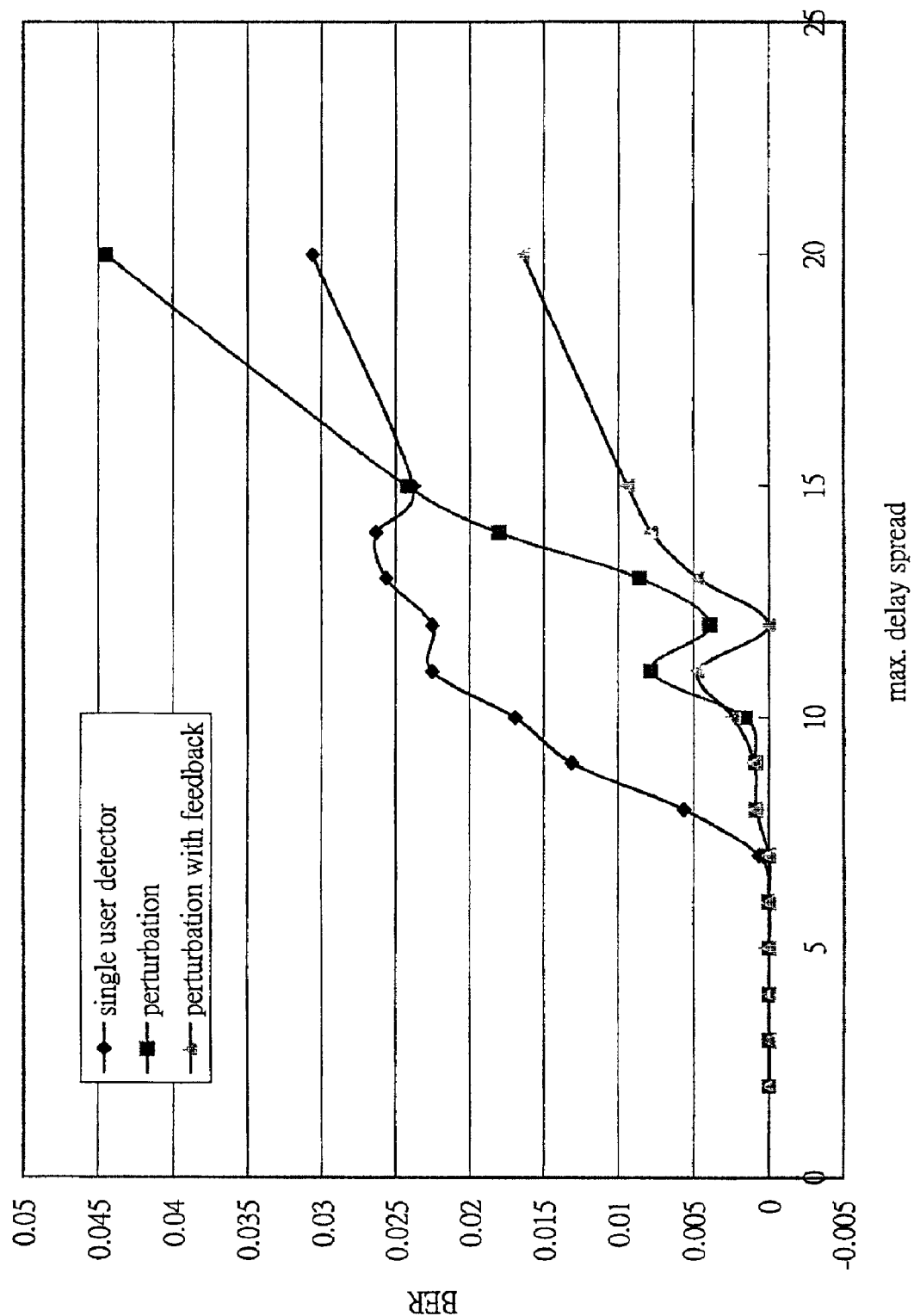
FIGS. 6–11 illustrate the results of perturbation correction simulation consistent with the present invention.

FIG. 6 illustrates the simulation of a static model in which each user transmits a code at a fixed and equal absolute amplitude and randomizes his delay at the beginning of a frame. The static model shows 16-dimensional Walsh codes being used by 16 users, and each user communicating 100 bits over the system. The 100 bits are divided into 10 frames, each consisting of 10 bits. Therefore, the signal of each user is measured in 10 bits/frame increments until the signal over the entire frame has been simulated.

Figure 7:
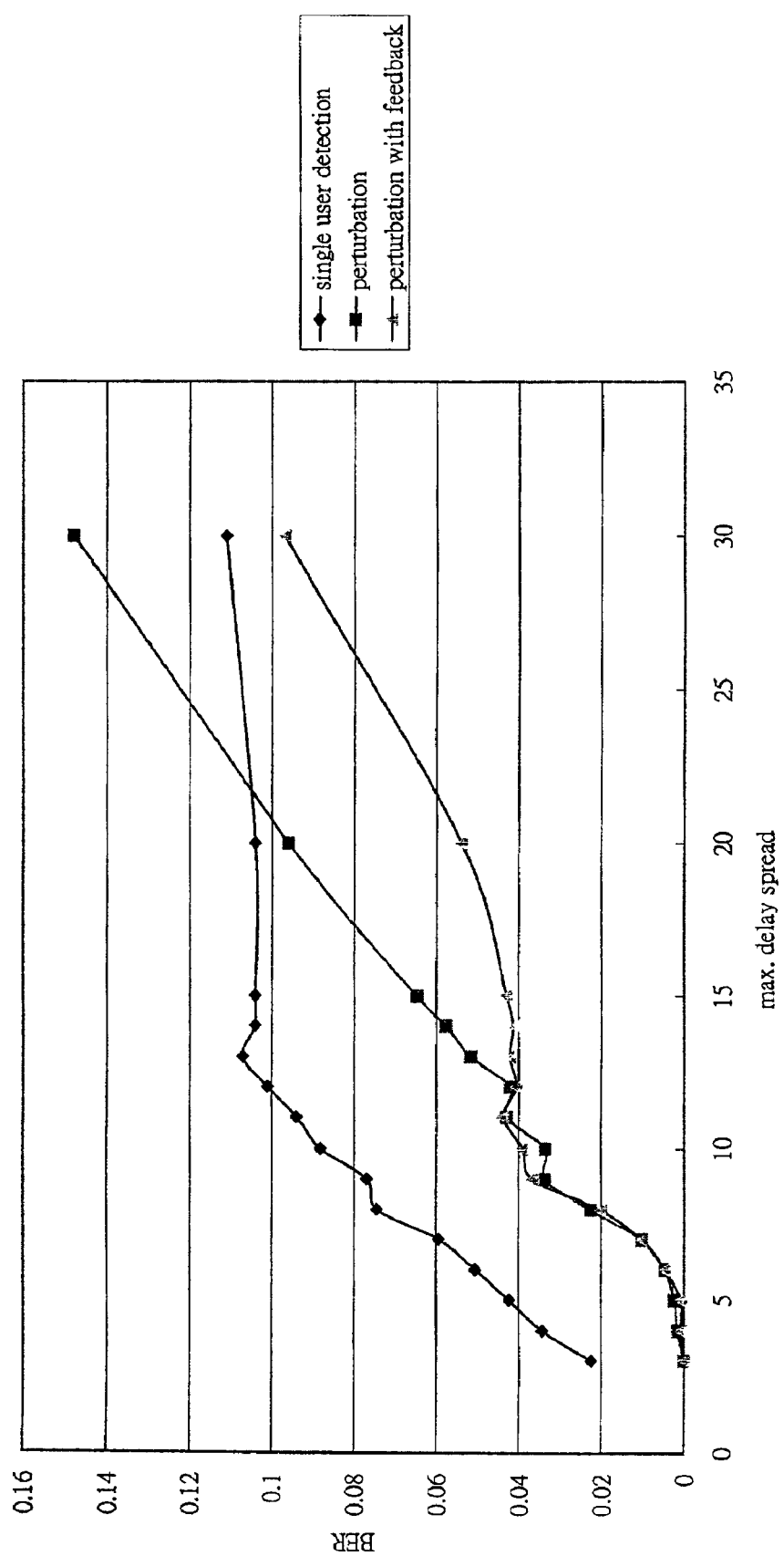
Figure 8:
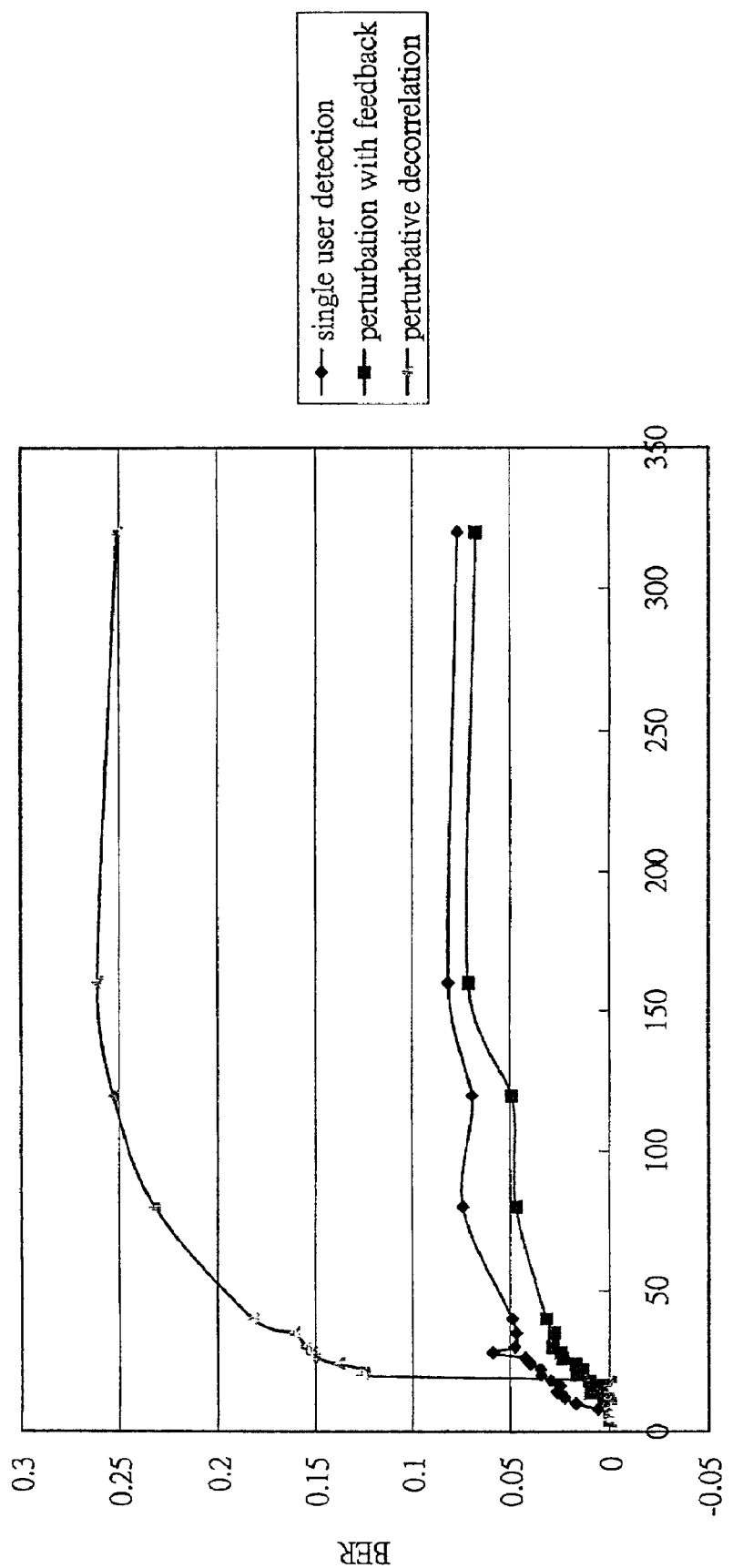

FIGS. 7 and 8 illustrate the results of simulating a near/far model using the present invention. Near/far is simulated by identical independent distribution (iid) of the user's amplitude, a technique well known in the art. All channel parameters including code delay and absolute amplitude of a user stay constant in a 10-bit frame but changes from frame-to-frame. The model illustrates the near-far problem, where signals of users transmitted from a location close to a receiver undergo less attenuation than those farther away. As a result, the signals transmitted from a farther distance encounter greater interference, especially from the signals transmitted by closer users. FIGS. 7 and 8 illustrate near-far resistance for the case of 16 and 32 users, respectively.

Higher order perturbation processing can further improve results. In high order perturbation processing, the current estimated value $c_{in}$ in Eq. (4) is equal to the symbol amplitude approximation value $a_{in}$ of the lower order perturbation. As discussed previously, Eq. (2) provides the amplitudes resulting from zero order perturbation. Eqs. (5) and (7) provide the first order perturbation based on projection and decorrelation and also provide identical formulas for higher order perturbation. In the second order perturbation, the estimated value $c_{in}$, in the summation of Eqs. (5) and (7), represents the amplitude $a_{in}$ of the first order perturbation. Regarding the first order perturbation, the first term $\tau_j$ in Eqs. (5) and (7) is the same term correlated with the middle symbol in the 3-symbol window during single user detection. While FIG. 1A shows only the first order perturbation, FIGS. 2–5 illustrate any order of perturbation in terms of the number of iterations executed in a frame before a new frame is triggered. If the results of the perturbation converge, i.e., $c'_{in}$ approaches zero, then the number of iterations is limited. Particularly, the convergence is guaranteed when the signal to interference ratio is larger than a predetermined value that is greater than one. High order perturbation processing determines the next (higher) order of symbol amplitude approximation, using Eqs. (3)–(8).

Figure 9:
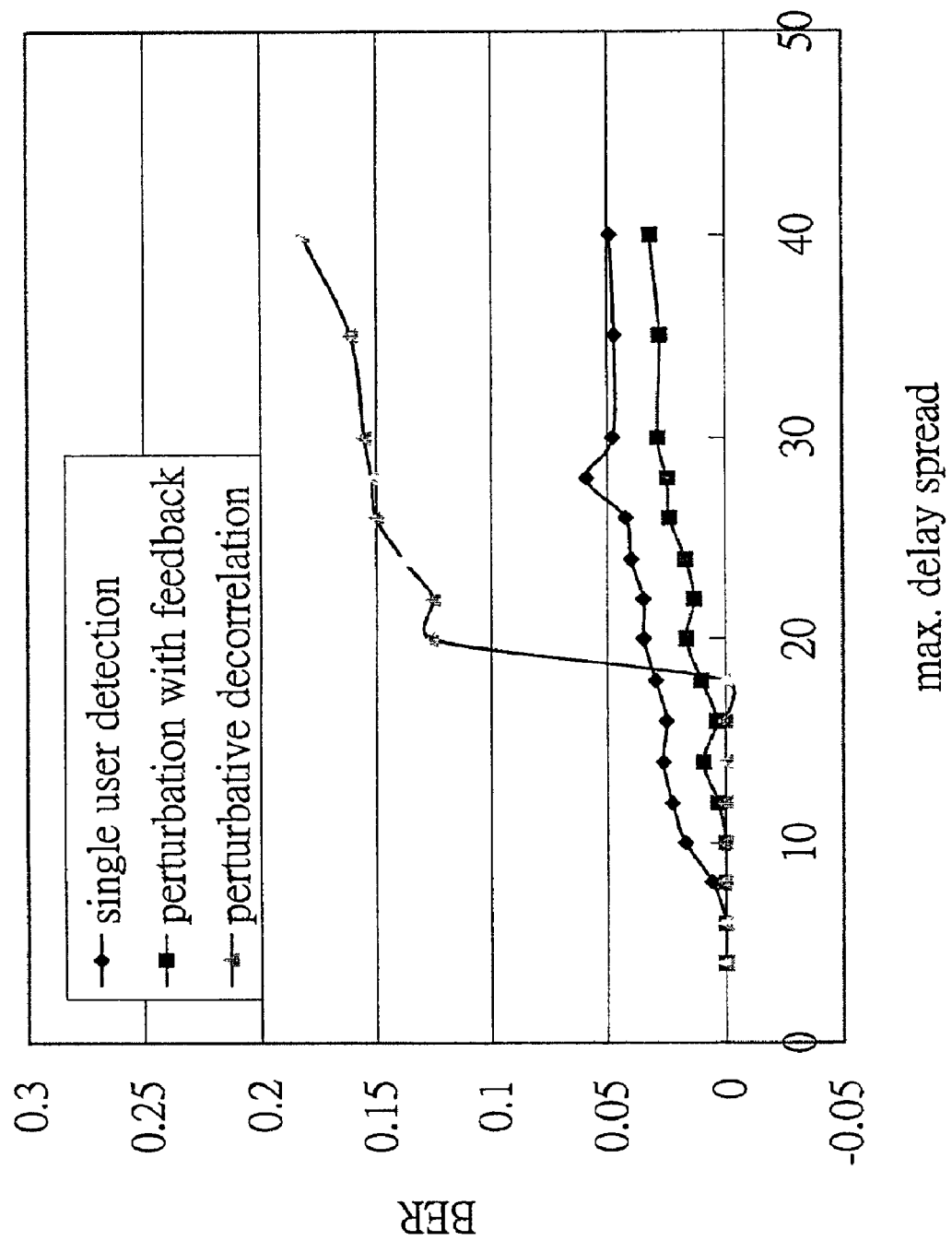

FIG. 9 is a snapshot of FIG. 8 at a point in time in which the delay spread of the signals is small.

Figure 10:
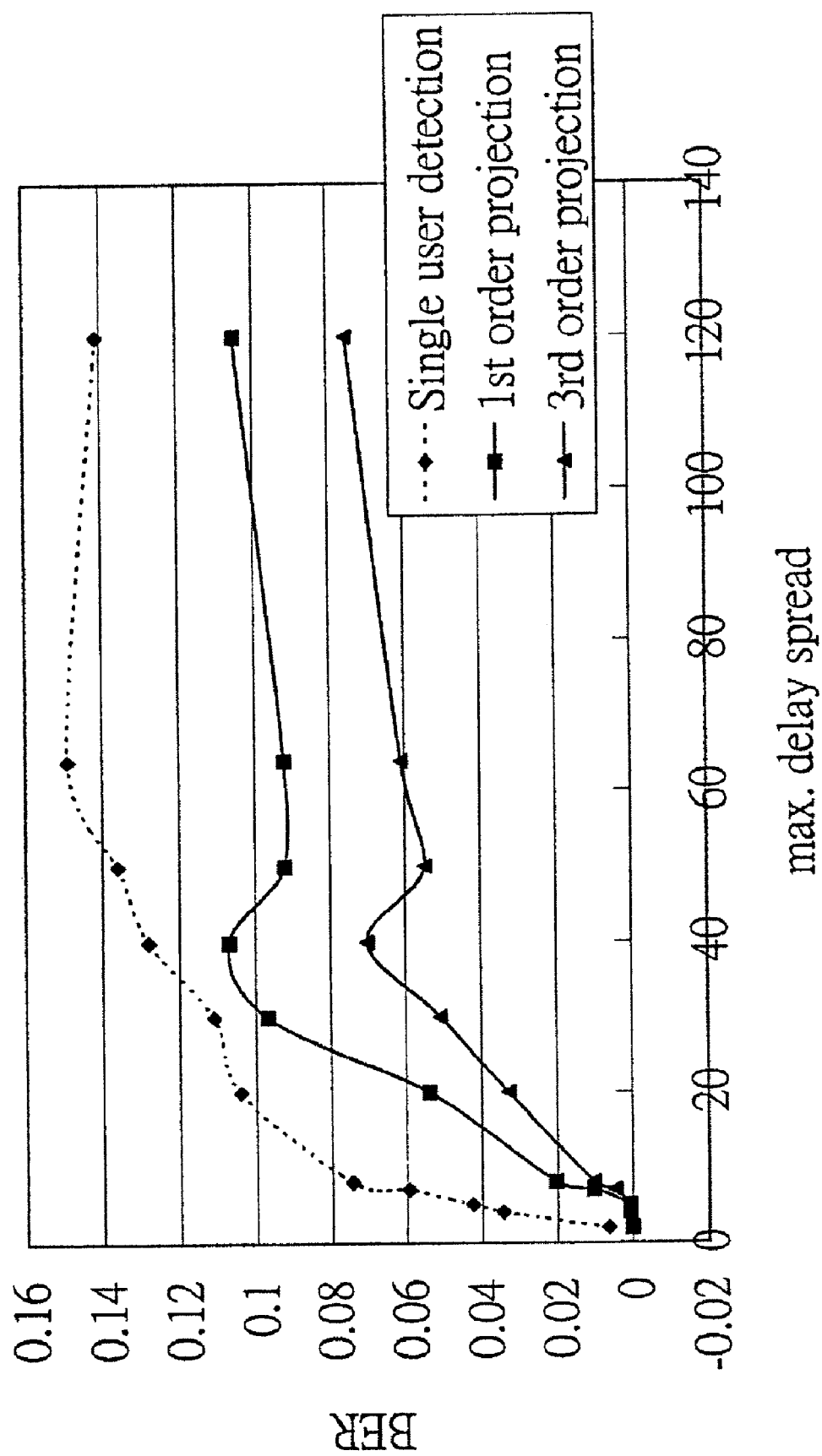
Figure 11:
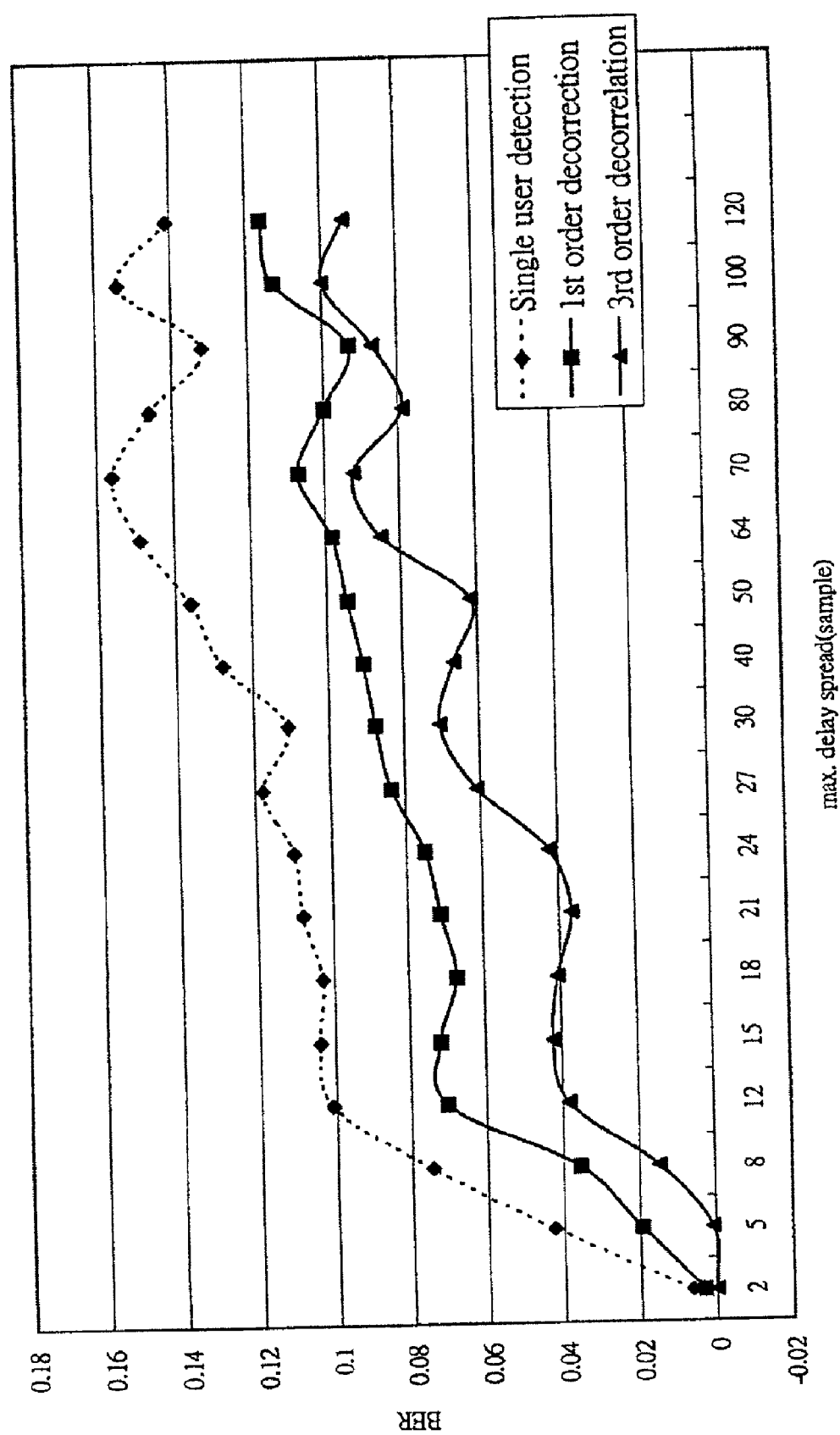

FIGS. 10 and 11 show the results of higher order perturbation simulation for 16 users. Particularly, FIG. 10 shows the results using a projection method, whereas FIG. 11 shows the results using decorrelation. Additionally, the third order perturbation results illustrated in each figure exhibit significant improvements over the first order perturbation results.

Equations (1) through (8) as mentioned above can be implemented in hardware (e.g., ASIC) or software (e.g., DSP) whichever is more convenient.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A method of single-user projection detection in a multiple-access communication system, comprising the steps of:
   i) defining a frame including a plurality of user signals, each user signal having at least three symbols within a window of the frame;
   ii) approximating a plurality of symbol amplitudes for each user among a plurality of users in the window;
   iii) computing a set of correlation matrices based upon a plurality of channel parameters in the frame;
   iv) calculating a current estimate of the approximated symbol amplitudes corresponding to at least one symbol of every user in the window using the set of correlation matrices in a perturbation correction technique; and
   v) shifting the window of the frame and returning to step (iv) when an entire user signal has not been processed.

2. The method according to claim 1, wherein the approximated symbol amplitudes are the current estimate of the approximated symbol amplitudes, the method further comprising the step of:
   vi) detecting signals of a single-user when the approximated symbol amplitudes for the single-user over the frame have been estimated.

3. The method according to claim 1, further comprising the step of:
   (vii) returning to step (iv) to perform higher order perturbation processing; and
   (viii) returning to step (ii) upon defining a new frame.

4. The method according to claim 1, wherein a perturbation correction value in step (iv) is obtained from a set of linear equations for calculating a plurality of perturbation amplitudes within the window based on a plurality of previously estimated amplitudes of each user and the correlation matrix in the window.

5. A method of multi-user decorrelation detection in a multiple-access communication system, comprising the steps of:
   i) defining a frame including a plurality of user signals, each user signal having at least three symbols within the frame;
   ii) approximating a plurality of symbol amplitudes for each user among a plurality of users in the frame;
   iii) computing a decorrelation matrix and a set of correlation matrices based upon a plurality of channel parameters in the frame;
   iv) calculating a current estimate of the approximated symbol amplitudes corresponding to at least one symbol of every user in the window using the decorrelation matrix and the set of correlation matrices in a perturbation correction calculation; and
   v) shifting the window and returning to step (iv) when an entire user signal has not been processed.

6. The method according to claim 5, wherein the approximated symbol amplitudes are the current estimate of the approximated symbol amplitudes, the method further comprising:
   vi) detecting signals of a single-user when the approximated symbol amplitudes for the single-user over the frame have been estimated.

7. The method according to claim 5, further comprising the step of:
   (vii) returning to step (iv) to perform higher order perturbation processing; and
   (viii) returning to step (ii) upon defining a new frame.

8. The method according to claim 5, wherein a perturbation correction value in step (iv) is obtained from a set of linear equations for calculating a plurality of perturbation amplitudes within the window based on a plurality of previously estimated amplitudes of each user and the correlation matrix in the window.

9. A method of detecting at least one of a plurality of users in a multiple-access communication system, comprising the steps of:
   i) defining a frame including a plurality of user signals, each signal being allocated at least three symbols within a window of the frame;
   ii) comparing a delay spread of the frame to a predetermined threshold;
   iii) approximating a symbol amplitude for each user of the plurality of users in the window;
   iv) computing a set of correlation matrices and a decorrelation matrix based upon a plurality of channel parameters in the frame, the set of correlation matrices and decorrelation matrix being determined by a result of the delay spread comparison;
   v) calculating a current estimate of the approximated symbol amplitude corresponding to at least one symbol of each user in the window using the determined matrices in a perturbation correction calculation; and
   vi) shifting the window and returning to step (v) when an entire user signal has not been processed.

10. The method according to claim 9, wherein the approximated symbol amplitude the current estimate of the approximated symbol amplitude, the method further comprising the step of:
   vii) detecting signals of the at least one of a plurality of users when the approximated symbol amplitude for a particular user over the frame has been estimated.

11. The method according to claim 9, comprising the step of:
   (vii) returning to step (iv) to perform higher order perturbation value processing; and
   (viii) returning to step (ii) when a new frame is defined.

12. The method according to claim 9, wherein the perturbation correction in step (v) is obtained from a set of linear equations for calculating a plurality of perturbation amplitudes within the window based on previously estimated amplitudes of each user and the correlation matrix in the window.

13. The method according to claim 9, wherein step (iv) includes the substep of computing the set of correlation matrices and decorrelation matrix when the delay spread is below the predetermined threshold.

14. The method according to claim 9, wherein step (iv) includes the substep of computing the set of correlation matrices when the delay spread is above the predetermined threshold.

15. A method of detection in a multiple-access communication system, comprising the steps of:
   i) defining a frame including a plurality of user signals, each user signal having at least three symbols within a window of the frame;
   ii) approximating a symbol amplitude for each user of a plurality of users in the frame;
   iii) obtaining a perturbation correction value using immediate feedback, wherein a new estimated amplitude is used as soon as it is available;
   iv) calculating a current estimate of the approximated symbol amplitude corresponding to at least one symbol of every user in the frame based upon a perturbation correction calculation; and
   v) shifting the window and returning to step (iv) when an entire user signal has not been processed.

16. The method according to claim 15, wherein the approximated symbol amplitude is the current estimate of the approximated symbol amplitude, the method further comprising the step of:
   vi) detecting signals of a single-user when the approximated symbol amplitude for the single-user over the frame have been estimated.

17. The method according to claim 15, further comprising the step of:
   (vii) returning to step (iv) to perform higher order perturbation processing; and
   (viii) returning to step (ii) upon defining a new frame.

18. The method according to any one of claims 1, 5, 9, or 15, wherein the symbols within the frame are defined by a group of channel parameters, step (i) of each claim further comprising the substeps of:
   defining a set of margins for each parameter of each user within a channel; and
   determining a duration of the frame based upon the set of margins.

19. The method according to claim 15, wherein the perturbation correction value in step (iii) is obtained from a set of linear equations for a plurality of perturbation amplitudes within the window based on a plurality of previously estimated amplitudes of each user and the correlation matrix in the window.

20. An apparatus for detecting at least one of a plurality of users in a multiple-access communication system comprising:
   means for defining a frame, wherein the frame includes a plurality of user signals each user signal having at least three symbols within a window of the frame;
   means for approximating a plurality of symbol amplitudes for each user among the plurality of users in the window;
   means for computing a set of correlation matrices based upon a plurality of channel parameters in the frame;
   means for calculating a current estimate of the approximated symbol amplitudes corresponding to at least one symbol for every user in the window using the set of correlation matrices in a perturbation correction technique;
   means for shifting the window of the frame and recalculating the current estimate of the approximated symbol amplitudes when an entire user signal has not been processed; and
   means for detecting signal of the at least one of a plurality of users when the approximated symbol amplitudes for the at least one of a plurality of users has been estimated.

* * * * *